United States Patent [19]
Schmitt

[11] Patent Number: 5,652,695
[45] Date of Patent: Jul. 29, 1997

[54] HARD DRIVE CARRIER DESIGN PERMITTING FLOATING RETENTION OF A CONNECTOR ASSEMBLY TO FACILITATE BLIND MATING OF THE CONNECTOR ASSEMBLY IN A HARD DRIVE BAY

[75] Inventor: Ty Schmitt, Round Rock, Tex.

[73] Assignee: Dell USA, L.P., Austin, Tex.

[21] Appl. No.: 435,895

[22] Filed: May 5, 1995

Related U.S. Application Data

[63] Continuation-in-part of Ser. No. 421,656, Jul. 10, 1995.
[51] Int. Cl.$^6$ ............................................. H05K 7/10
[52] U.S. Cl. ........................................ 361/685; 439/928.1
[58] Field of Search ................................. 361/683–685; 439/95, 159, 928.1

[56] References Cited

U.S. PATENT DOCUMENTS

| | | | |
|---|---|---|---|
| 5,229,919 | 7/1993 | Chen | 361/685 |
| 5,451,168 | 9/1995 | Shuey | 439/159 |

*Primary Examiner*—Leo P. Picard
*Assistant Examiner*—Jayprakash N. Gandhi
*Attorney, Agent, or Firm*—Skjerven, Morrill, MacPherson, Franklin & Friel; Stephen A. Terrile

[57] ABSTRACT

A one-piece carrier body is disclosed for floatingly supporting a removable hard drive in a hard drive bay of a computer system. A printed wire assembly (PWA) board or card mounts on the carrier to provide an interface connection between the hard drive and internal connectors in the hard drive bay. The carrier body has a connector end for receiving the PWA board, which includes side guide channels that are molded using a reverse draft through core-outs in the carrier base. The side channels have a general trapezoidal shape, with a wide base portion and a narrow top portion. The connector end of the carrier body also includes a front lip and a transverse rib defining a guide channel on the base of the carrier body. The endpoints of the narrow top portion of the side guide channels align in the same plane as the base of the front lip and the rib, respectively, to prevent the PWA board from tilting after it is inserted in the connector end. The side guide channels and the base guide channel are designed with clearance for the board to permit the PWA board to float in the x, y, and z directions to facilitate blind mating of the connectors on the PWA board to the internal connectors in the hard drive bay. In addition, a pair of spring ground contacts are provided to bias the PWA card in the z direction to enable the PWA board to engage the internal connectors regardless of the positioning of the PWA board in the base guide channel.

28 Claims, 9 Drawing Sheets

HARD DRIVE CARRIER DESIGN PERMITTING FLOATING RETENTION OF A CONNECTOR ASSEMBLY TO FACILITATE BLIND MATING OF THE CONNECTOR ASSEMBLY IN A HARD DRIVE BAY

CROSS REFERENCE TO RELATED APPLICATION

This application is a continuation-in-part of co-pending U.S. application serial No. 08/421,656, filed Jul. 10, 1995, for CARRIER-BASED MOUNTING STRUCTURE FOR COMPUTER PERIPHERAL CHASSIS, which was assigned to the assignee of the present invention.

BACKGROUND OF THE INVENTION

The present invention relates generally to a carrier for supporting a hard drive in a personal computer (PC) system. More particularly, the present invention relates to a carrier design which facilitates the blind mating of a connector assembly to an internal connector in a housing. Still more particularly, the present invention relates to a one-piece carrier body for supporting a hard drive, which permits an interface connector to float in three dimensions to facilitate blind mating within a hard drive bay.

The components provided in a PC system typically comprise a combination of fixed, internal devices, and peripheral external devices that may be added to the PC system to increase the computing power or to add features not included as part of the fixed PC system supplied by the manufacturer. The PC system, for example, typically includes a motherboard on which most of the fixed internal processing circuitry of the PC is mounted. While working memory (such as random access memory or RAM) may be mounted on the motherboard, typically permanent memory devices are not.

In most computer systems, permanent memory is provided in a memory hard drive, or hard disk. The term "hard" is used to indicate that this type of drive or disk is fixedly installed in the PC system, unlike a floppy drive, which is very easily removable. Hard drives typically are made of metal or plastic disks that are coated with a ferromagnetic material. The disks usually have a standard thickness, and are available in a variety of sizes. In conventional hard drives, a plurality of disks are mounted in a cartridge pack, with supporting interface electronics to support hard disk services and to expedite the transfer of data between the hard drive and the computer system. Hard drives capable of storing in excess of 1 Gigabytes of data have become commonplace in personal computing systems and file servers (jointly referred to herein as "PC systems" or "computer systems").

In the past, hard drives were considered fixed memory assets of the PC system. More recently, however, it has become increasingly popular to configure PC systems to permit hard drives to be removed from the PC system. Thus, for example, if the hard drive malfunctions, it is removed and replaced with another hard drive. Similarly, if storage space becomes limited in the hard drive, hard drives can be added, replaced, or upgraded. As part of the computer reconfiguration necessary to support this removal of hard drives, computer manufacturers now typically configure PC systems with a hard drive bay that is easily accessible by the user. According to conventional techniques, and as shown in FIG. 1, the hard drive bay 5 includes internal connectors 15 for receiving a mating connector assembly 12 on the hard drive package 14. As shown in FIG. 1, in certain computer systems the hard drive bay 5 may be designed to accommodate a plurality of removable hard drives 14.

In an effort to make hard drive replacement easier, many computer manufacturers have developed carriers 7 that are designed to support the hard drives, and to facilitate the insertion and removal of the hard drives 14 in the computer system. Typically, the hard drive 14 mounts on the carrier 7, and the carrier slides into a guide-rail assembly 11 that has been provided in the hard drive bay 5 of the computer system. In addition, the carrier 7 typically has mounted thereon the connector assembly 12, which comprises a printed wire assembly (PWA) board. The PWA board connects electrically to the hard drive package 14 to provide a connection interface for the hard drive. The PWA board includes an on-board connector that mates with the internal connectors 15 in the PC hard drive bay 5, when the hard drive carrier 7 is fully inserted into the bay. The PWA board thus acts as an electrical and a mechanical interface between the hard drive and the internal connectors in the hard drive bay. In addition to providing electrical connections to the hard drive package, the PWA board also connects to a system ground in the computer system to insure proper grounding of the electrical interface to prevent spurious signals.

One of the problems that has developed with the use of removable hard drives arises because the mating of the connectors on the PWA board to the internal connectors in the hard drive bay must be performed blindly. The user typically must grasp the connector assembly end (where the PWA board is mounted), and then must slide the carrier into the hard drive bay, hoping that the connectors on the PWA board mate with the internal connectors in the bay. In many instances, the internal connectors are located ten inches or more inside the external surface of the computer. In addition, the user may not be able to see the engagement of the connectors because the carrier and hard drive must be fully inserted into the hard drive bay before engagement occurs. Moreover, if the PWA board connector does not mate properly with the internal connectors in the hard drive bay, the user will tend to jam the carrier more forcefully in the bay, which could result in damage to the connector assemblies, or to the ground connection between the PWA board and the system ground. Yet another problem is that the PWA board is positioned in the carrier in such a manner that it tends to tilt during engagement with the internal connectors. This phenomena occurs because the carrier body typically is molded of plastic, which requires that all carrier surfaces have some draft (or angle) to permit removal from the mold. Because of this draft on the surfaces bearing against the PWA board, the PWA board will tend to tilt to follow the draft angle.

In an attempt to overcome some of these problems, at least one manufacturer has suggested using a carrier which permits the PWA to move or "float" as the hard drive is inserted in the hard drive bay to facilitate the connection of the PWA to the internal connectors. While this arrangement appears to offer some improvement to the prior systems, it does not completely eliminate the problems outlined above. One deficiency with this system is that the PWA is only permitted to float in the x and y planes. As a result, if the hard drive is placed in the bay with excessive force, the suggested design does not provide any relief to protect the connector assemblies. Secondly, this proposed floating design is constructed out of multiple pieces, requiring increased manufacturing and assembly costs.

Despite the clear and apparent need for a carrier design that provides a three dimensional float, that eliminates the tendency of the PWA board to tilt, and which can be constructed in a one-piece design to minimize molding and assembly costs, to date no such design has been developed.

SUMMARY OF THE INVENTION

The present invention solves the shortcomings and deficiencies of the prior art by providing a carrier which permits the printed wire assembly (PWA) board to float in all directions, including in a direction that is normal to the face of the PWA board, while also eliminating the tendency of the board to tilt. The connector end of the carrier body is specially configured to securely receive the PWA board, while providing clearances in the x, y, and z directions to permit the PWA to float during the mating of the PWA with the PC internal connections. The end of the carrier includes side guide channels which restrict movement of the PWA in the x, y and z direction. The side guide channels are configured with a trapezoidal cross-section in the y-z coordinate system for receiving the PWA, and for securing the PWA in the x and z directions. The PWA is secured in place in the y direction by an upper shoulder that defines the top of the trapezoidal-shaped side channel.

The carrier also includes a rib molded on the base of the carrier, positioned in parallel with the front lip of the carrier to define a guide channel in the base of the carrier. The lower portion of the PWA board is positioned between the rib and front lip, to secure the lower portion of the card in the z direction. In the preferred embodiment, the rib and lip are molded with a slight angle or draft. The base of the rib and lip preferably are aligned in the same plane as the endpoints of the shoulder on the side channels. As a result, the tendency of the PWA board to tilt is eliminated, and the float permitted the PWA in the z direction is the same at both the top and bottom.

The PWA board includes two ground pads on its back or inside face, which preferably contact a pair of ground springs. The ground springs are formed of a conductive metal, and form part of a one-piece ground structure that lies inside the carrier body. The ground springs which contact the PWA board provide a biasing force in the z direction, permitting the PWA board to float, in a controlled manner, in the z direction. The grounding structure includes side springs that preferably connect to a ground in the PC system, when the carrier body is inserted into the hard drive bay.

According to the preferred embodiment of the invention, the carrier body is molded as a single piece of plastic, thereby reducing molding costs and subsequent assembly costs. The rib and front lip are formed with a standard draft piece. The side channels, however, are formed with a reverse draft, through the use of core-outs in the carrier base. The core-outs are located at the ends of the base channel.

BRIEF DESCRIPTION OF THE DRAWINGS

For a more detailed description of the preferred embodiment of the present invention, reference will now be made to the accompanying drawings, wherein.

Figure 1:
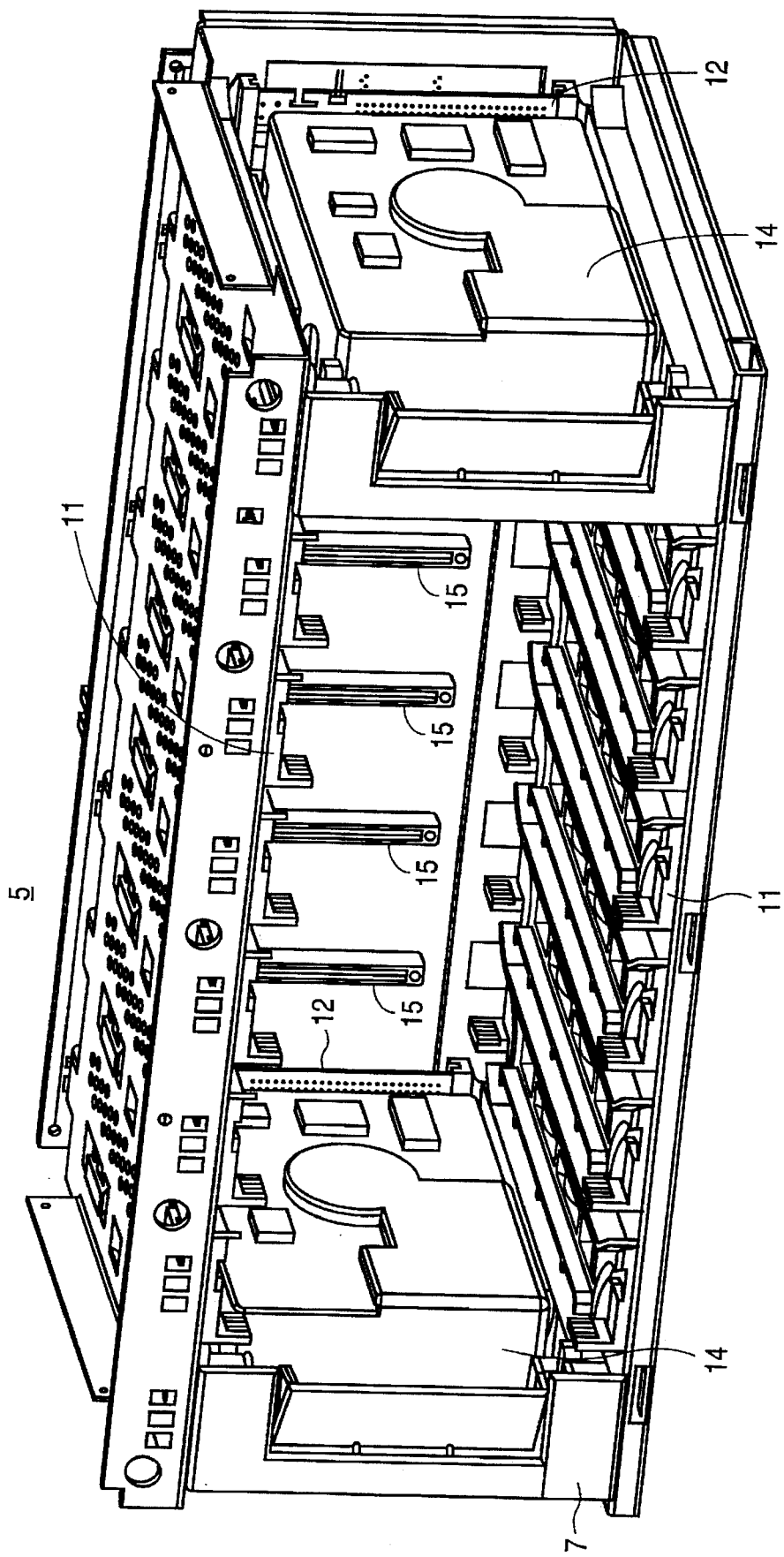
FIG. 1 is a perspective view illustrating an exemplary PC hard drive bay with a hard drive carrier inserted therein.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 2:
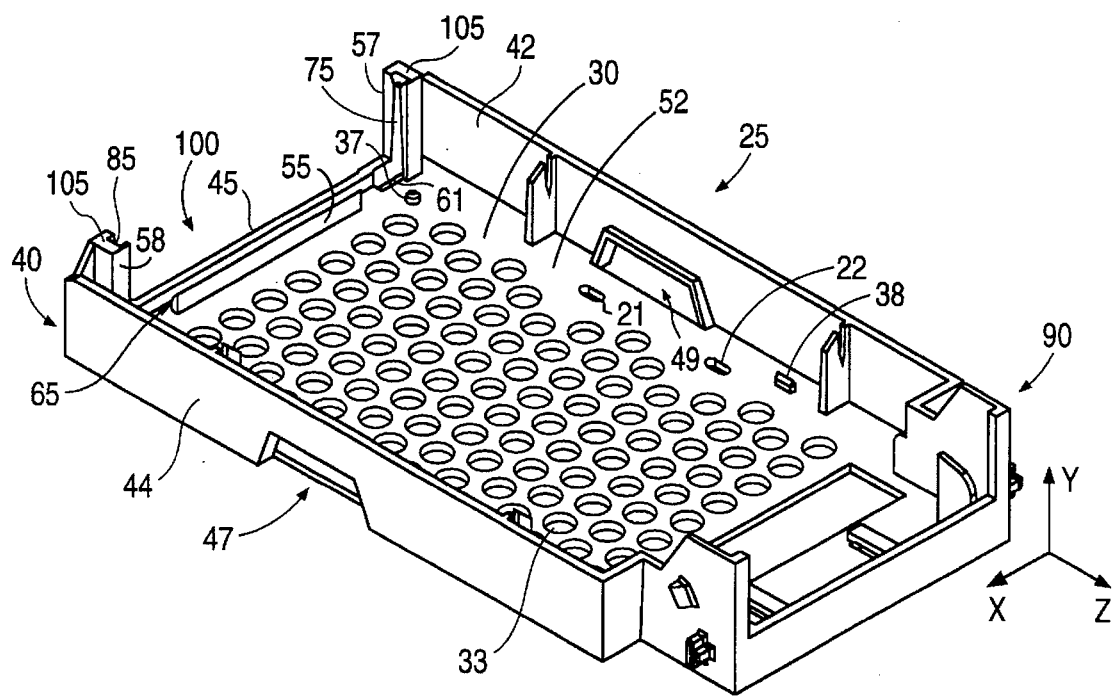
FIG. 2 is a perspective view along the handle end of the carrier body constructed in accordance with the preferred embodiment.

Referring now to FIG. 2, a carrier body 25 constructed in accordance with the preferred embodiment generally includes a base 30, side walls 42, 44, a connector end 40, and a handle end 90. The carrier body 25 preferably attaches to a handle (not shown) at handle end 90. In accordance with the preferred embodiment, the carrier body 25 is constructed as a unitary piece through a molding process, and is designed to accommodate removable hard drives in a computer system. The carrier body 25 disclosed herein may, however, also be used in any system in which a printed wire assembly (PWA) board must mate blindly with a remote connector. In addition, the term "PC system" or "computer system" as used herein, is intended to include all personal computers, file servers, and any other computer system which includes a hard drive bay for receiving a removable hard drive.

Figure 6:
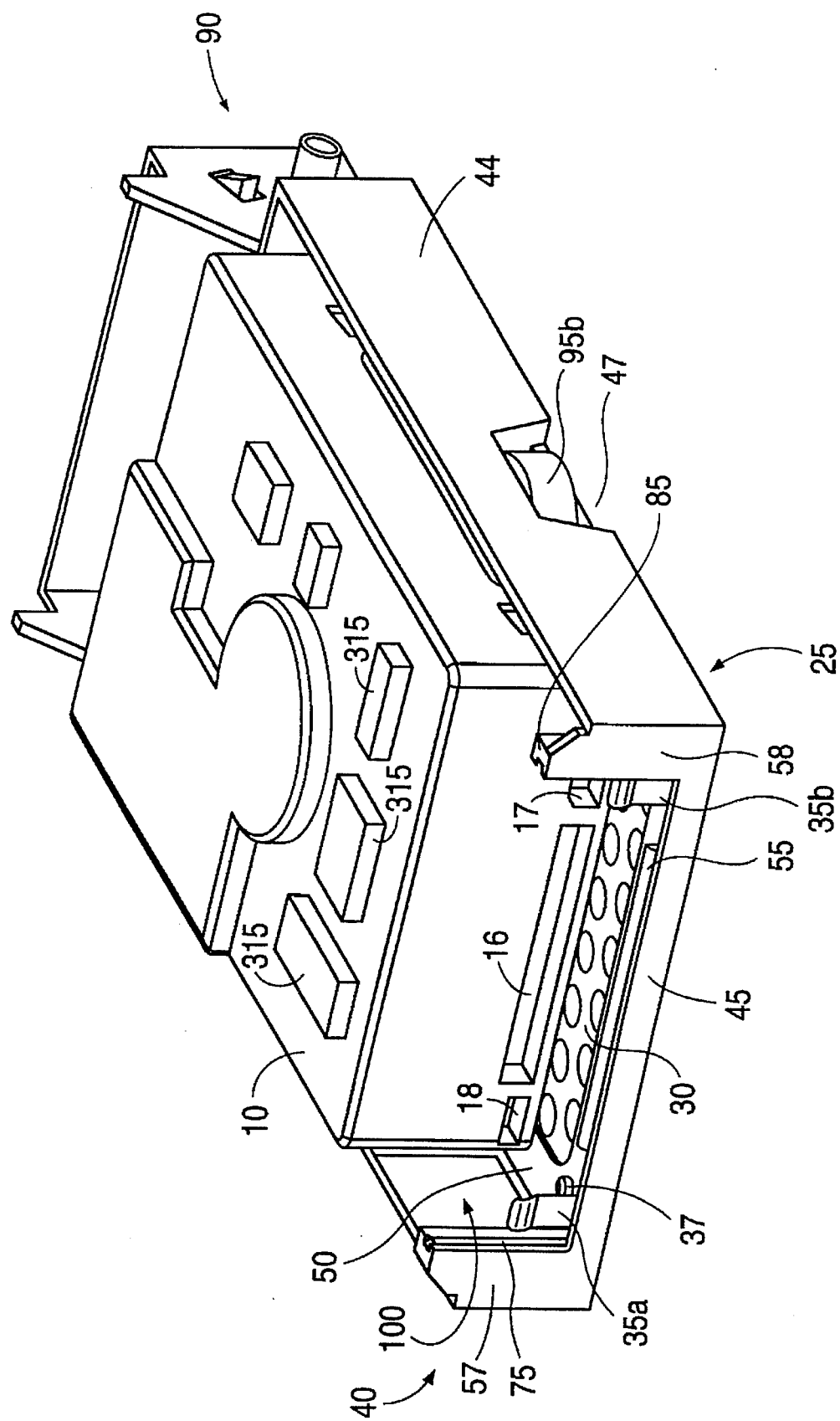
FIG. 6 is a top perspective view illustrating a hard drive mounted in the carrier body of FIG. 2.

According to the preferred embodiment, and as shown in FIG. 6, a removable hard drive 10 is shown supported in the carrier body 25. As will be understood by one skilled in the art, the hard drive package 10 comprises a generally three-dimensional rectangular structure, as shown, with integrated circuits 315 mounted on the exterior surface(s) of the package. The hard drive package 10 also includes various electrical connectors 16, 17, 18, through which the hard drive 10 receives and drives logic signals, and also receives operating power. The hard drive 10 mounts to the base 30 of carrier body 25 by a plurality of screws (not shown) which pass through a grounding structure 50 and base 30.

The following description will focus primarily on the configuration of the connector end 40 and base 30, in accordance with the present invention. Additional details regarding the remainder of the carrier body 25 may be obtained from commonly assigned U.S. application Ser. No. 08/421,656, filed Apr. 12, 1995, for CARRIER-BASED MOUNTING STRUCTURE FOR COMPUTER PERIPHERAL CHASSIS, the teachings of which are incorporated herein.

Figure 3:
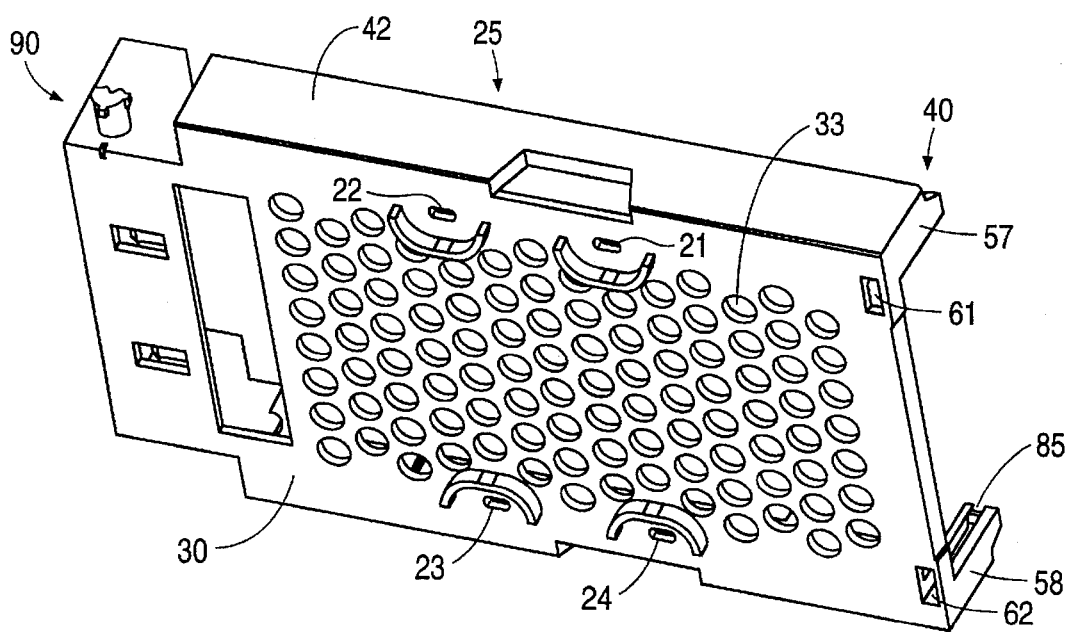
FIG. 3 is a bottom perspective view of the carrier body of FIG. 2.
Figure 4:
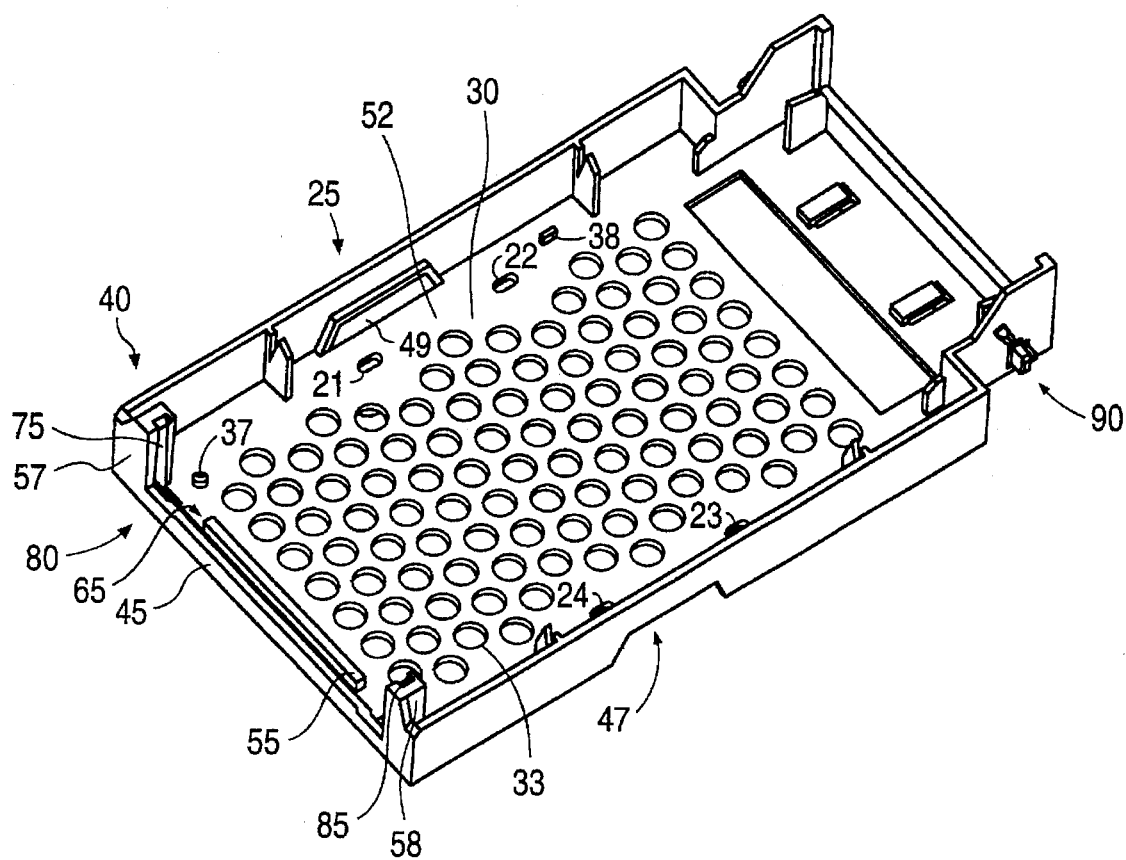
FIG. 4 is a perspective view of the carrier body of FIG. 2, taken along the connector end.

Referring now to FIGS. 2, 3, and 4 (which depict various views of the carrier body 25), the base 30 of carrier body 25 preferably has a plurality of apertures 33 through which air flows. The airflow through apertures 33 provides cooling to the hard drive components when the carrier body 25 is inserted into the hard drive bay of the computer system (shown in FIG. 1). Additional apertures 21, 22, 23, 24 preferably are provided in the base 30, spaced in a generally rectangular pattern. Apertures 21, 22, 23, 24 are designed to receive mounting screws (not shown) which mount the hard drive onto the carrier body 25.

As best seen in FIGS. 2 and 4, the upper face 52 of the base 30 also includes a number of projections (some of which are shown as 37, 38). As will be described more fully below, projections 37, 38 are designed to properly align grounding structure 50 (FIG. 5) within the carrier body 25. Other projections, not shown specifically, may also be used for this purpose.

Figure 7A:
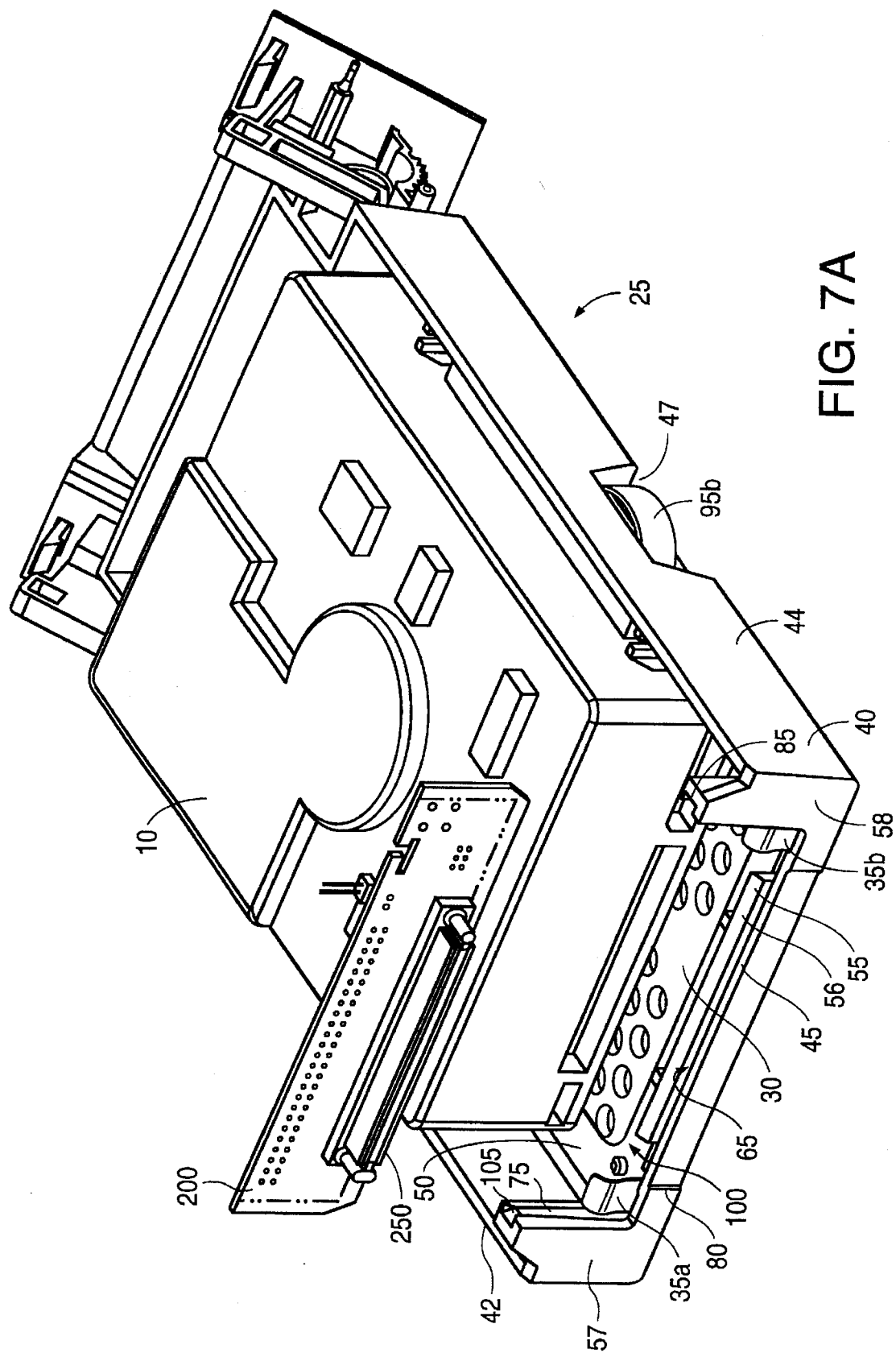
FIGS. 7A and 7B are perspective views of the carrier body illustrating the manner in which the printed wire assembly (PWA) board is mounted.
Figure 7B:
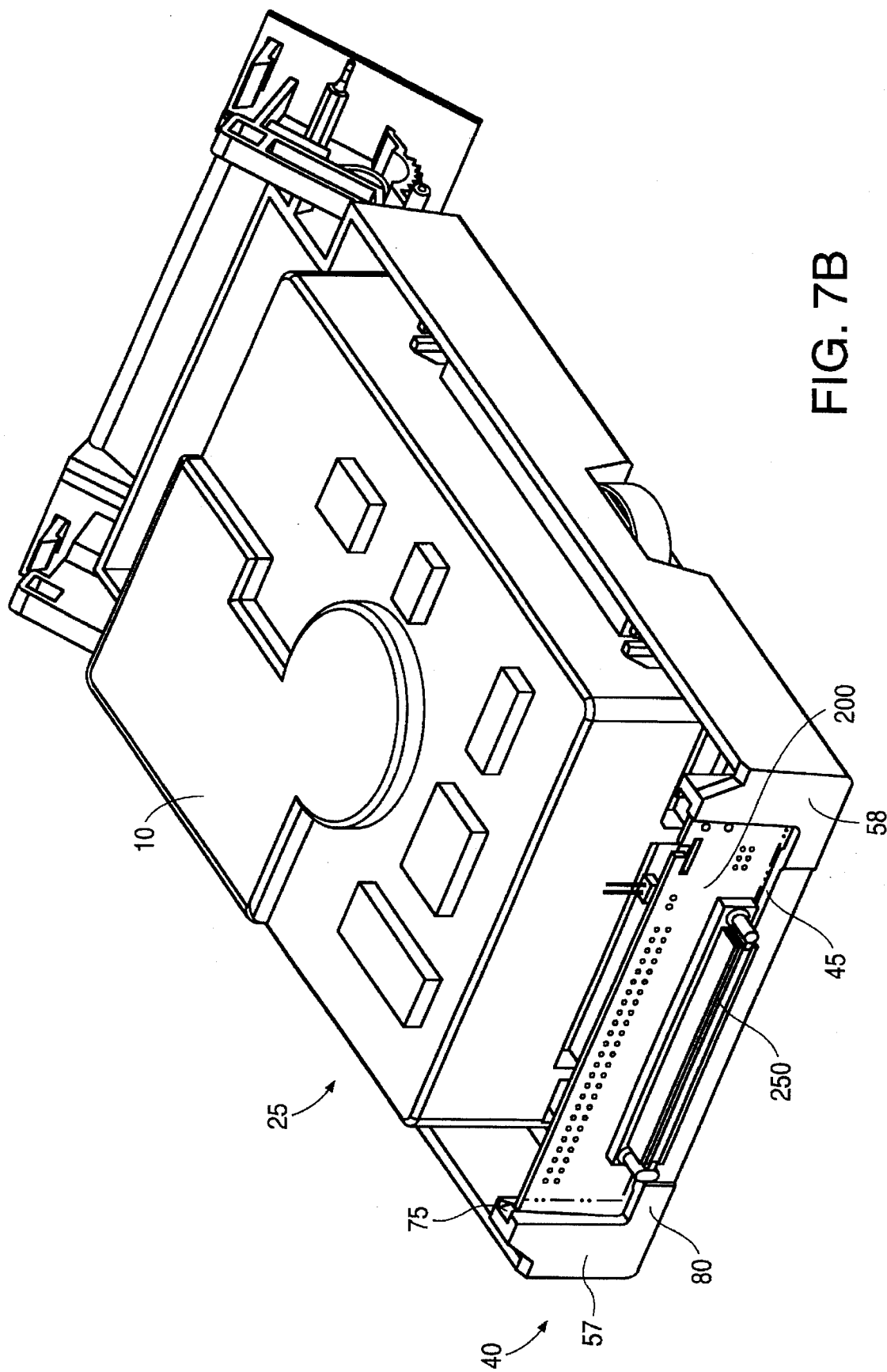

Referring to FIGS. 2, 4, 7A and 7B, the connector end 40 of carrier base 25 preferably is designed to accommodate a connector board, or printed wire assembly (PWA) board 200 (shown in FIGS. 7A and 7B). The PWA board 200 includes a connector 250 which provides an electrical and mechanical interface between internal connectors in the hard drive bay (FIG. 1), and the hard drive 10 (FIG. 7). In accordance with the preferred embodiment, the connector end 40 of carrier body 25 preferably includes front lip 45, rib 55, and side guide channels 75, 85 that are formed in side members 57, 58, respectively. As will be described, the PWA board 200 is secured along its side edges and upper corners in side guide channels 75, 85, and along its bottom edge between front lip 45 and rib 55.

Figure 9:
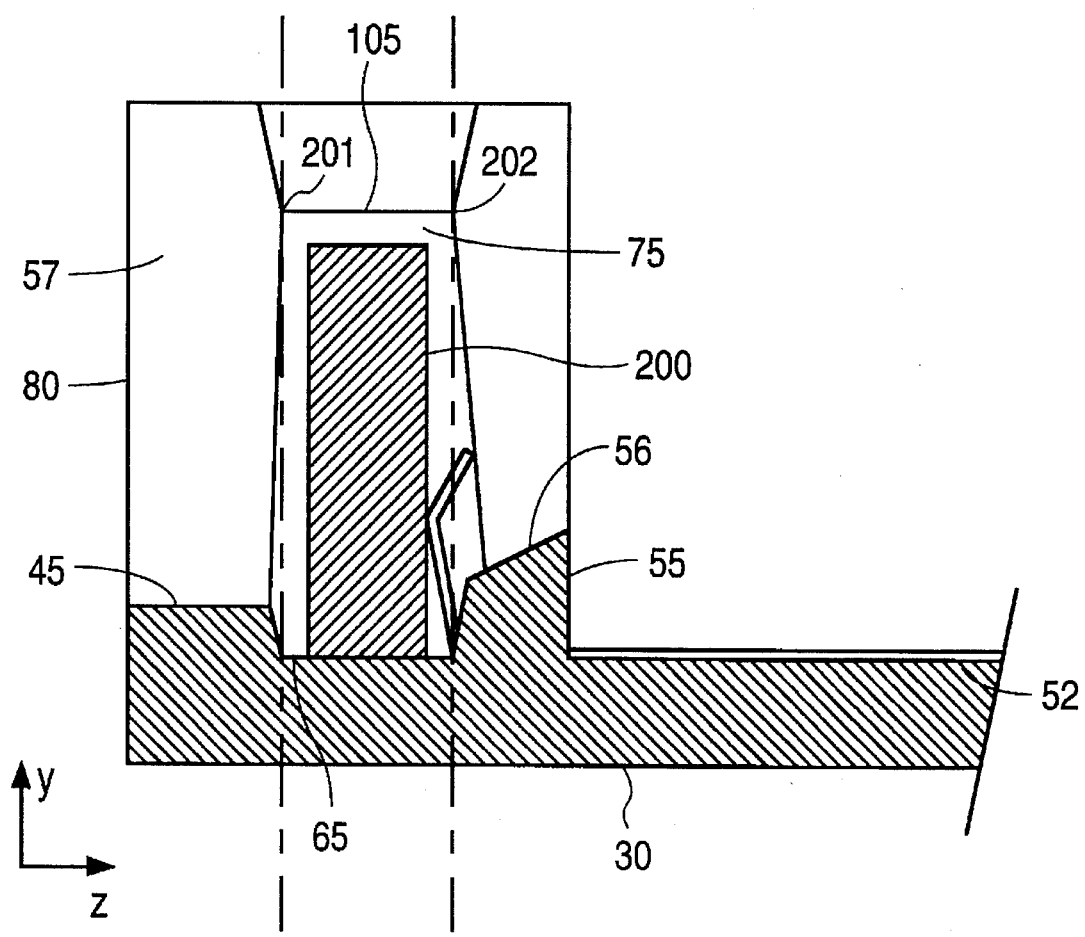
FIG. 9 shows a side elevation, partially in cross-section, taken along the front lip and rib of the carrier body of FIG. 7B, with the PWA board mounted thereon.

Referring now to FIGS. 2, 4 and 9, the front lip 45 preferably is molded integrally with the carrier body 25, and extends upwardly at an angle that is almost perpendicular (i.e., with a relatively minor draft, such as, for example, an angle of 5°) to the base 30. This draft is desired to facilitate removal of the carrier body 25 from the mold. The front lip 45 has a height that is much less that the height of side members 57, 58. Thus, the front lip 45 extends only partially up the end face 80 of the carrier body 25, to define a rectangular cut-away section 100 in end face 80 between side members 57, 58. As best seen in FIGS. 7A and 9, the PWA board 200 mounts in the cut-away section 100, with the connector 250 extending beyond the end face 80 to permit engagement with the internal connectors in the hard drive bay.

Referring still to FIGS. 2, 4 and 9, the transverse rib 55 preferably extends across the upper face 52 of base 30 in a direction parallel to front lip 45, to define a guide channel 65 between the front lip 45 and rib 55. The rib 55 preferably is integrally molded with the carrier body 25. The rib 55 extends from the base 30 to a height that is slightly greater than the height of front lip 45. As best seen in FIG. 9, rib 55 extends upwardly from the base 30 with a slight draft, such as for example, an angle of 5°, before tapering at a more substantial angle (such as 45°) to its apex. The resulting taper section 56 provides a surface for guiding the PWA board 200 between rib 55 and lip 45 during the mounting of the PWA board in the carrier body 25. In the preferred embodiment, front lip 45 and rib 55 are spaced a predetermined distance apart to provide a clearance in the guide channel 65 that exceeds the width of the PWA board, thereby enabling the PWA board 200 to float in the z direction during insertion of the carrier body 25 and hard drive 10 into the hard drive bay 5 of FIG. 1. In the preferred embodiment, a clearance of 0.025" is provided. As one skilled in the art will understand, more or less tolerance may be provided as desired.

Referring to FIGS. 2, 4 and 7A, the side members 57, 58 protrude from the side walls 42, 44 along the end face 80 of the carrier body 25. The side members 57, 58 define the lateral edges of cut-away section 100, to secure the sides and upper corners of the PWA board 200. In the preferred embodiment, side guide channels 75, 85 are formed in the inner faces of the side members 57, 58, respectively. As best seen in FIG. 9, side guide channels (only 75 is shown in FIG. 9) have a trapezoidal cross-section in the y-z coordinate system, with an enlarged base channel portion, and a narrower top channel portion. As shown in FIG. 9, the top channel portion of side guide channels 75, 85 preferably align in the same plane (in the y direction) as the base of front lip 45 and the base of rib 55. Thus, endpoint 201 aligns in the same y plane as the base of front lip 45, while endpoint 202 aligns in the same y plane as the base of rib 55. As a result of this configuration, the PWA board 200 does not tilt when properly positioned between lip 45 and rib 55, and in side guide channels 75, 85. In addition, the PWA board's float in the z direction is the same at both the top and bottom of the PWA.

Referring to FIGS. 2, 4, and 9, the depth of the side guide channels 75, 85 in side members 57, 58 preferably is chosen to provide a predetermined amount of float in the x direction for the PWA board 200. In the preferred embodiment, a clearance of 0.025" is provided at both sides of the PWA board 200. The side guide channels 75, 85 also preferably have an upper shoulder 105 securing the PWA board 200 in the y direction. A clearance preferably is provided between the upper edge of the PWA board 200 and the shoulder 105 to permit the PWA board to float in the y direction.

Figure 5:
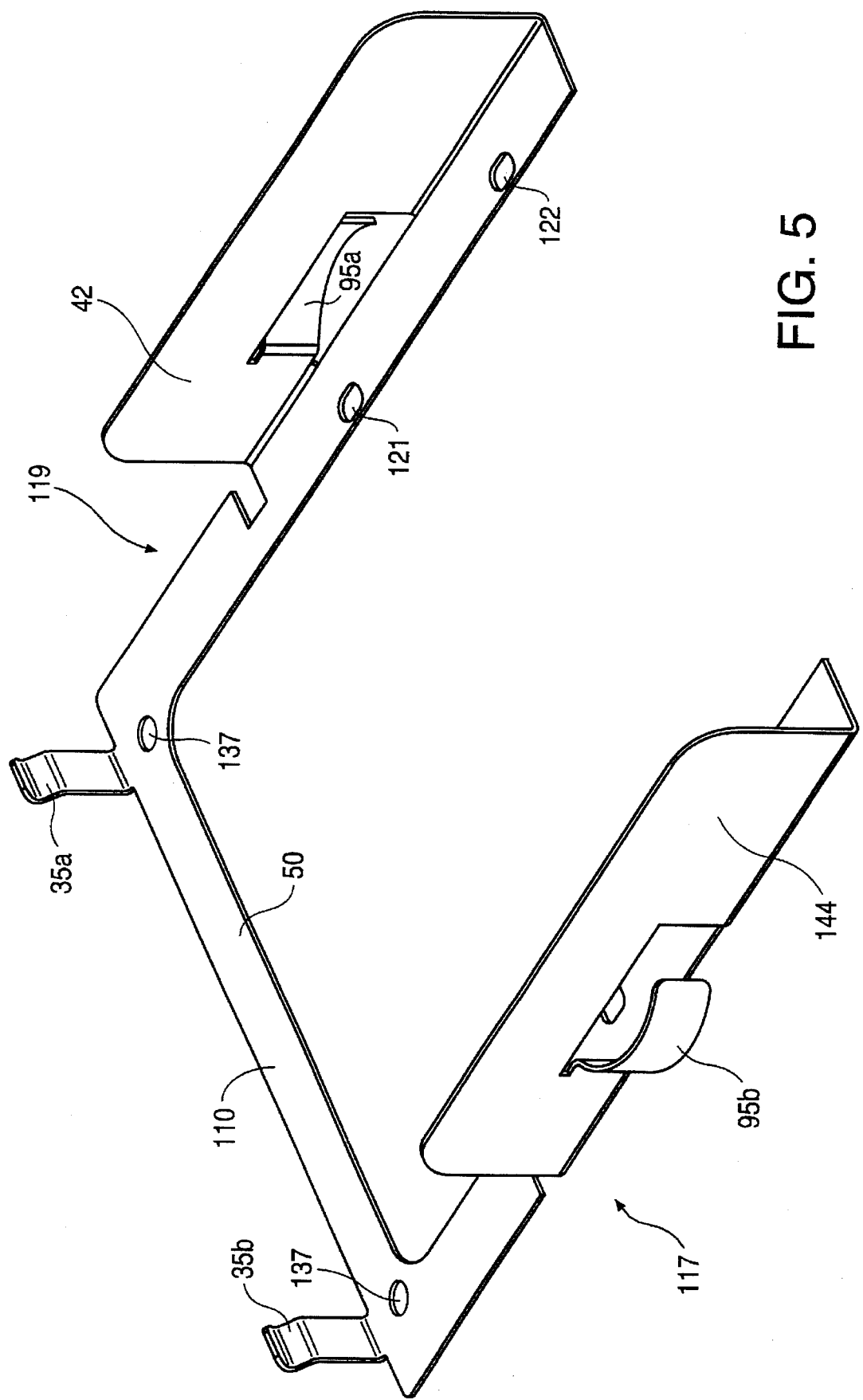
FIG. 5 is a perspective view of the grounding structure, which mounts inside the carrier body of FIG. 2.

Referring now to FIGS. 2 and 5, a ground structure 50 preferably mounts on the base 30 of carrier body 25. In the preferred embodiment, the ground structure 50 comprises an electrically conductive metal plate specially configured to fit in the carrier body 25. The ground structure preferably includes spring contacts 35a, 35b at the front section 110 of the structure 50, and side sections 117, 119. Apertures 137 are provided in front section 110 for receiving protrusions 37 in the base 30 to position and align the grounding structure 50 in the base 30. Apertures 121, 122, 123, 124 also are provided in side sections 117, 119, which are designed to align with apertures 21, 22, 23, 24 in the base 30. In the preferred embodiment of FIG. 6, the hard drive 10 mounts on top of the grounding structure 50, and is secured to the base by screws which extend through apertures 121, 122, 123, 124 in grounding structure 50, and through apertures 21, 22, 23, 24 in base 30.

As shown in FIGS. 2 and 4, the side walls 42, 44 of carrier body 25 each include a trapezoidal shaped aperture 47, 49. The side sections 117, 119 include a vertical member 142, 144, that is designed to abut the side walls 42, 44, respectively. Each of the vertical members 142, 144 has formed therein spring clips 95a, 95b, respectively. In the preferred embodiment, the spring clips 95a, 95b extend through apertures 47, 49 in the side wall to contact lance members located in the hard drive bay, effectively connecting ground structure 50 to a system ground in the PC. Preferably, multiple spring clips are provided on each side section 117, 119 which protrude through multiple apertures in each side wall 42, 44. By using multiple spring clips, the first clip can be designed to wipe past the lance to discharge any static build-up. The second spring clip then can be used to establish the permanent contact with the system ground through the lance.

The spring contacts 35a, 35b, as shown in FIGS. 6 and 7A, preferably are positioned in the region of cut-away 100, to make electrical contact with conductive ground pads on the back face of the PWA board. In addition to establishing a ground connection to the PWA board, the spring contacts 35a, 35b also function to bias the PWA board forwardly in the z direction. As the connector on the PWA board mates with the internal connectors in the hard drive bay, spring contacts 35a, 35b flex backwardly, permitting the PWA board to float in the z direction to facilitate the mating of the connectors, and to prevent damage to the connectors and to the ground connection. In addition, the spring contacts 35a, 35b also compensate for manufacturing tolerances which may cause misalignment in the z direction, by providing a yieldable biasing force to enable the mating of the PWA board with the internal connector regardless of its position with respect to lip 45 and rib 55.

Referring now to FIGS. 5, 7A and 7B, the manner in which the PWA board 200 is inserted into the connector end 40 of the carrier body 25 now will be described. The bottom corners of the PWA board 200 are placed in the side guide channels 75, 85, and the PWA board 200 is pushed toward the base 30 of carrier body 25. The back bottom portion of the PWA board 200 contacts the ground springs 35a, 35b, biasing the PWA toward end face 80. As the PWA board 200 is lowered toward the base 30, the bottom of the PWA board 200 is guided into guide channel 65, between rib 55 and lip 45, by taper section 56. At approximately the same time, the side members 57, 58 flex outwardly as the PWA board 200 is forced toward base 30, enabling the PWA board to clear the shoulders 105. Once the upper corners of the PWA board clear shoulders 105, side members 57, 58 flex back to their original position, causing the PWA board 200 to be positioned securely in the side guide channels 75, 85, and between lip 45 and rib 55, as shown in FIG. 7B.

Figure 8:
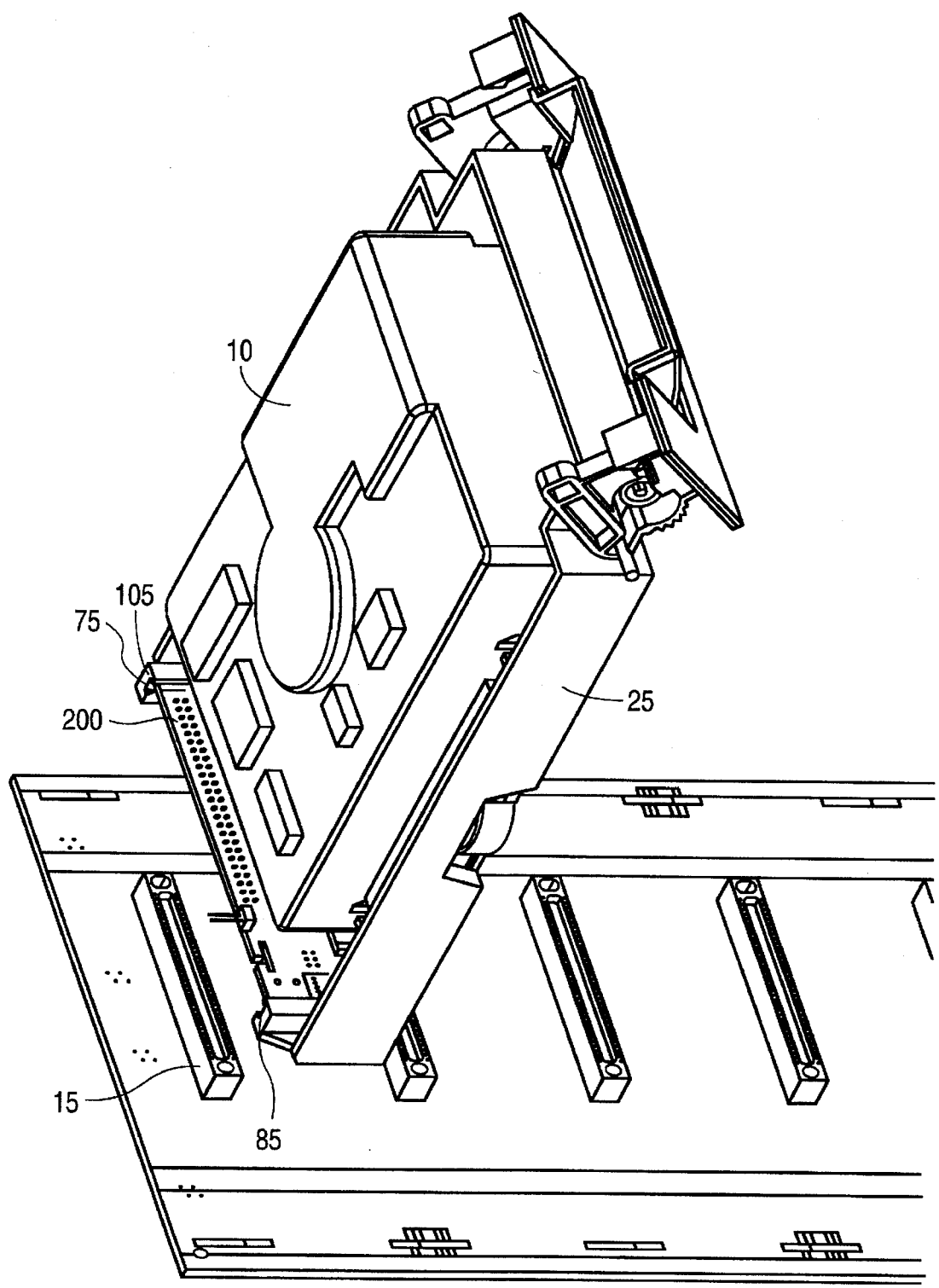
FIG. 8 is a perspective view showing the manner in which the carrier body mates with the internal connectors in the hard drive bay of FIG. 1.

Referring now to FIGS. 8 and 9, when the carrier body 25 is inserted into the hard drive bay to mate with the internal connector 15, the PWA board 200 floats three dimensionally to facilitate mating with the internal connector. The PWA beard floats in the x direction (along the end face 80), due to the clearances provided in the side guide channel 75, 85. Similarly, the PWA board 200 floats in the y direction (perpendicular to the base 30) due to the clearance provided between the shoulder 105 and the upper edge of the PWA board 200. Finally, the PWA board 200 floats in the z direction because of the clearance provided between lip 45 and rib 55, and between the top channel portion of channels 75, 85. The ground contact springs 35a, 35b provide a preloaded force in the z direction strong enough to overcome insertion forces and friction as the PWA board connector 250 engages the internal connector 15 in the hard drive bay 5. The preloaded spring force is not strong enough, however, to prevent the PWA beard 200 from traveling backward, or from flexing if stressed (which could occur for example, if the connectors do not mate properly, or if the combined effect of tolerances cause misalignment in the z direction). The spring, therefore, insures that the connector on the PWA board mates in both the extreme forward position and in the extreme rearward position, and everywhere in between.

The method of manufacturing the carrier body 25 as a one-piece structure now will be described with general reference to FIGS. 2 and 3. In the preferred embodiment, the carrier body 25 preferably is constructed as flame-retardant ABS, which is formed in a mold using conventional molding techniques. To form the carrier body 25 as a one-piece structure, a normal draft is used to configure the base 30, including rib 55, and from lip 45. In the preferred embodiment, a reverse draft is used in the molding process to form the side guide channels 75, 85 and stop shoulders 105. According to the preferred embodiment, core-outs 61, 62 are provided in the base 30, at the respective ends of guide channel 65 to create the reverse draft. The reverse draft permits the carrier body 25 to receive and maintain the PWA board vertically, instead of being tilted as would be the case if only a normal draft was used.

The present invention is susceptible to numerous variations without departing from the principles disclosed herein. The foregoing disclosure and the following claims are intended to cover all such modifications and variations.

I claim:

1. A carrier body for supporting a hard drive, comprising:
   a pair of side members located at a first end of said carrier body, said side members having side guide channels formed therein;
   said side guide channels having a base portion, and a narrower top portion, and said side members having a shoulder at the top of the side guide channels;
   a connector board positioned in said carrier body, with each side of the connector board positioned in said side guide channels, and the upper corners of said connector board positioned below the shoulders on said side members; and
   wherein said carrier body is molded as a single piece of plastic.

2. A carrier body as in claim 1, wherein said carrier body includes a base.

3. A carrier body as in claim 2, further comprising core-out sections in said base which are used to mold said side guide channels.

4. A carrier body as in claim 3, further comprising a front lip and a rib integrally molded as part of the base to define a base guide channel for receiving the lower edge of said connector board.

5. A carrier body as in claim 4, wherein said base guide channel has a width greater than the thickness of said connector board to provide float for the bottom edge of said connector board in the z direction.

6. A carrier body as in claim 2, wherein the shoulder is positioned at a height above the base of the carrier body which is greater than the height of the connector board to provide a float for the connector board in the y direction.

7. A carrier body as in claim 1, wherein said side guide channels have a width that is greater than the thickness of the connector board to provide float for the connector board in the z direction.

8. A carrier body as in claim 7, further comprising a grounding structure within the carrier body.

9. A carrier body as in claim 8, wherein the grounding structure includes a grounding spring which contacts the connector board and biases the connector board in the z direction.

10. A carrier body as in claim 9, wherein the grounding spring connects electrically to a grounding pad on the connector board.

11. A carrier body as in claim 10, further comprising a second grounding spring for biasing the connector board in the z direction.

12. A carrier body as in claim 11, wherein the grounding springs provide sufficient force to enable the connector board to mate with an internal connector.

13. A carrier body as in claim 12, wherein said grounding springs will yield if the connector board is not properly mated with the internal connector.

14. A carrier body as in claim 1, wherein side guide channels have a depth to provide float for the connector board in the x direction.

15. A carrier body for supporting a hard drive, comprising:
   a carrier body base;

a pair of side members located at a first end of said carrier body, said side members having side guide channels formed therein;

said side guide channels having a base portion, and a narrower top potion, and said side members having a shoulder defining a stop at the top of the side guide channels;

a connector board positioned in said carrier body, with each side of the connector board positioned in said side guide channels, and the upper corners of said connector board positioned below the shoulders on said side members;

a guide channel formed in the carrier body base; and a grounding structure positioned in said carrier body, said grounding structure including a grounding spring that biases said connector board forwardly in said base guide channel.

16. A carrier body as in claim 15, wherein said base guide channel is defined by a rib and a lip that are integrally molded in the carrier body base.

17. A carrier body as in claim 15, wherein said base guide channel has a width that is greater than the width of the connector board to provide a clearance for the connector board, and said grounding spring enables the connector board to mate with a remote connector at any position within the base guide channel.

18. A carrier body as in claim 17, wherein said connector board includes a connector on its front face for mating with the remote connector.

19. A carrier body as in claim 18, wherein the remote connector is located in a hard drive bay in a computer.

20. A carrier body as in claim 18, wherein the connector board includes a ground pad on its back face for connecting electrically to said grounding spring.

21. A carrier body as in claim 15, wherein the carrier body is molded as a one-piece structure.

22. A carrier body for supporting a hard drive, comprising:

a carrier body base;

a pair of side members located at a first end of said carrier body, said side members having side guide channels formed therein;

said side guide channels having a base portion, and a narrower top portion, and said side members having a shoulder defining a stop at the top of the side guide channels;

a connector board positioned in said carrier body, with each side of the connector board positioned in said side guide channels, and the upper corners of said connector board positioned below the shoulders on said side members;

a guide channel formed in the base of said carrier body between a lip in a front face of said carrier body, and a rib in the base of said carrier body, the rib having a rib base and the lip having a lip base; and wherein the narrower top portion of said side guide channel defines a first and second endpoint, and said first endpoint lies in the same vertical plane as the lip base, and the second endpoint lies in the same vertical plane as the rib base.

23. A carrier body as in claim 21, wherein said connector board assumes a vertical position in said guide channel.

24. A carrier body as in claim 22, further comprising a grounding structure positioned in said carrier body, said grounding structure including a grounding spring that biases said connector board forwardly in said base guide channel.

25. A carrier body as in claim 24, wherein said grounding structure also includes a side clip for connecting to a system ground.

26. A carrier body as in claim 22, wherein said carrier body is molded as a one-piece structure.

27. A carrier body as in claim 22, wherein said side channels, said stop, and said base guide channel all are designed with clearances to permit the connector board to float three-dimensionally in said carrier body.

28. A computer system comprising:

a processor;

a memory coupled to the processor;

a hard drive coupled to the processor and the memory; and a carrier body for supporting the hard drive, further comprising:

a pair of side members located at a first end of the carrier body, the side members having side guide channels formed therein;

the side guide channels having a base portion, and a narrower top portion, and the side members having a shoulder at the top of the side guide channels; and a connector board positioned in the carrier body, with each side of the connector board positioned in the side guide channels, and the upper corners of the connector board positioned below the shoulders on the side members;

wherein the carrier body is molded as a single piece of plastic and wherein the hard drive is attached to the carrier body, the hard drive being coupled to the connector board, and the connector board being coupled to the processor.

* * * * *